Nov. 17, 1931.  V. V. UTGOFF  1,832,799
METHOD OF PRODUCING AMINO PYRIDINES
Filed May 4, 1927
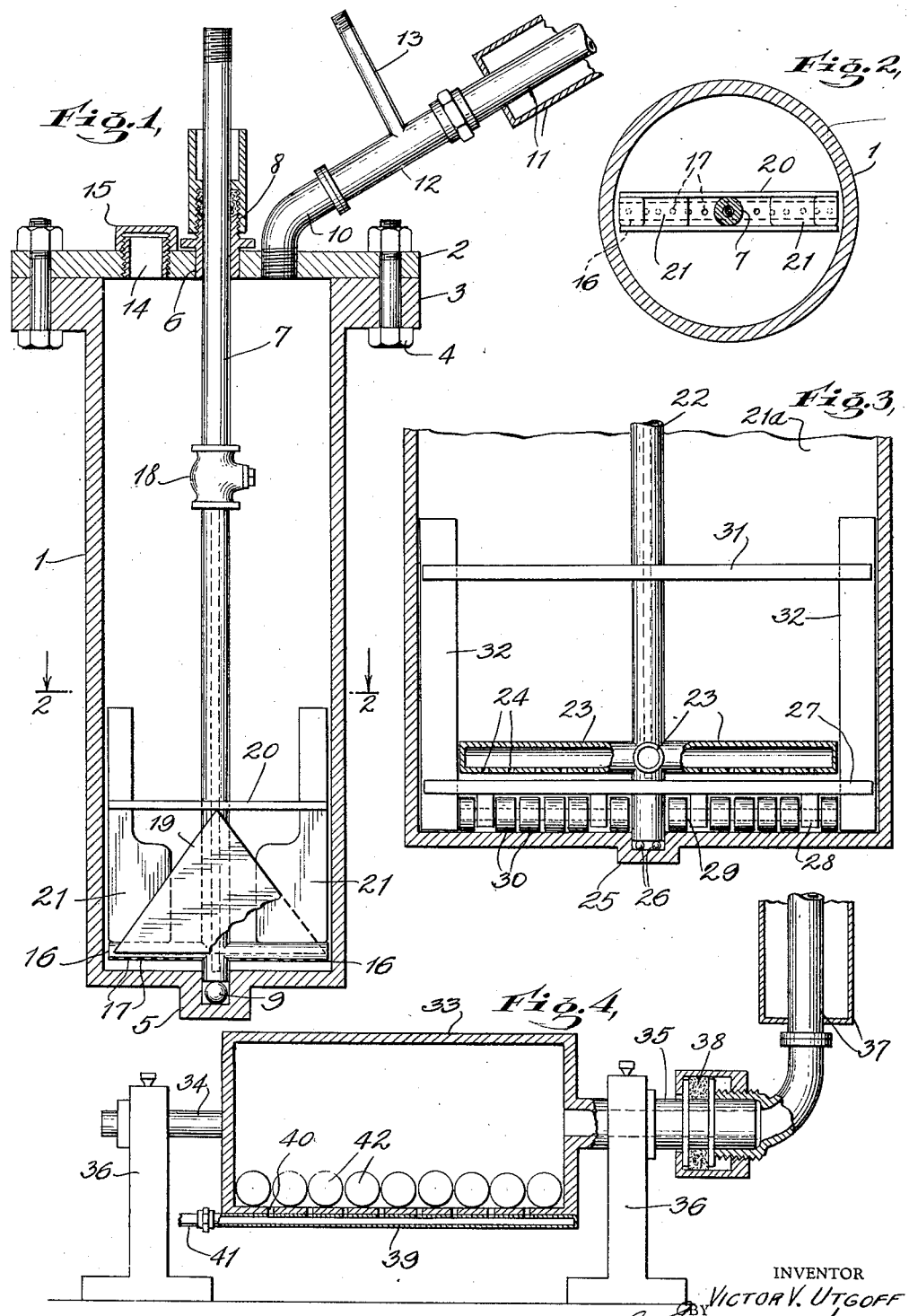
INVENTOR
VICTOR V. UTGOFF
ATTORNEY Patented Nov. 17, 1931

1,832,799

UNITED STATES PATENT OFFICE

VICTOR V. UTGOFF, OF ROOSEVELT, NEW YORK, ASSIGNOR TO ROOSEVELT CHEMICAL CO., OF ROOSEVELT, NEW YORK, A CORPORATION OF NEW YORK

METHOD OF PRODUCING AMINO PYRIDINES

Application filed May 4, 1927. Serial No. 188,877.

This invention is an improvement in methods and apparatus for preparing the amino pyridines, and more particularly alpha-alpha diamino pyridine.

In the usual method of preparing the amino pyridines finely pulverized sodamide is reacted with pure anhydrous pyridine in an oily medium. Because of the fact that even traces of impurities in the ingredients may considerably reduce the yield, it is highly desirable that the pyridine be freshly redistilled and dry, and that the sodamide be newly prepared.

The sodamide is obtained by fusion of sodium metal during treatment with ammonia gas. The sodium is heated to a temperature of about 350° C., and dry ammonia gas is intimately mixed therewith, as by bubbling the gas through the fused metal.

This reaction results in the production of sodamide, which on cooling consolidates or cakes into a hard mass, and in order to react it with the pyridine it must be finely pulverized, and the pulverization must take place in a dry atmosphere, because of the affinity of the sodamide for water.

After pulverization, the sodamide and pyridine are mixed in the oily medium, usually vaseline oil, diethyl or dimethyl aniline. Thus two complete operations are required, one being the formation of the sodamide, and the other the reacting of the sodamide with the pyridine.

The product of the sodamide-pyridine reaction is a sodium compound of amino pyridine, and must be decomposed to produce the amino pyridine. This is done by means of water, resulting in the formation of sodium hydroxide or caustic soda and the amino pyridine sought, which is crystallized out with benzol, toluol, xylol or the like. The caustic soda catalyzes the oxidation of a part of the amino pyridine, and this is lost as an impurity, restricting the yield of the sought amino pyridine.

In the present process, and by means of the apparatus shown, the procedure is greatly simplified, all of the steps of the process necessary to the production of the amino pyridine constituting a continuous operation in a single vessel.

One of the primary objects of the present invention is the provision of a process for preparing amino pyridines, and particularly alpha-alpha diamino pyridine in such manner as to attain a maximum yield of the pure product.

Another object is the provision of a process wherein the usual step of crushing and pulverizing the agglomerated or caked hard sodamide is eliminated.

Another object is the provision in the process of preparing amino pyridines, a new and improved method of decomposition of the sodium product obtained by reacting sodamide with pyridine.

Another object is the provision in the process above mentioned of a step enabling the direct addition of oil to the sodamide in the state of fusion without danger of ignition of the oil.

Another object is the provision of a new and improved apparatus for carrying out the process.

With these and other objects in view the invention consists in the method and the several steps thereof, and in the apparatus for carrying out the method, it being understood that various changes in the form, proportion, size and minor details of machine construction within the scope of the claims, may be resorted to without departing from the spirit of the invention.

In the drawings:

Fig. 1 is a vertical section of one embodiment of apparatus.

Fig. 2 is a section on the line 2—2 of Fig. 1.

Fig. 3 is a view similar to Fig. 1, showing the lower end of an alternate construction.

Fig. 4 is a longitudinal vertical section of another alternate construction.

In the present process, a closed retort is provided, and the sodium metal is placed therein and heated to a temperature of about 350° C. Dry ammonia gas is bubbled up through the fused metal, and when the surface indicates by the disappearance of unchanged metal that the ammonia-sodium reaction is complete, the mixture is allowed to cool to a temperature just below the igniting point of the oil which is to be used as the medium for the pyridine.

Stirring is not essential during the first stage, but facilitates the reaction, and the reaction is also facilitated by some pressure in the vessel. This may be obtained in any suitable manner, as for instance by restricting the outlet for the gas. During the cooling, however, the fused sodamide is subjected to an energetic agitation, of a character such as to thoroughly crush and pulverize the same as it cools, so that there is no consolidation of caking of the sodamide.

As soon as the sodamide is cooled just below the ignition point of the oil to be used, 250° C. for vaseline oil, the cold oil is poured in. The oil solidifies the sodamide or a part thereof, but because of the energetic agitation, it solidifies in granules, large and small, and these are broken, crushed and comminuted, by the said agitation. After about one half hour of this crushing agitation, the sodamide is in the form of a fine powder intimately mixed with the oil.

When the mixture has attained a temperature of about 135° C., pure anhydrous pyridine is added, in the proportion of about equal parts of pyridine and sodamide. A reaction between the sodamide and the pyridine takes place which results in the formation of sodium amino pyridine. Hydrogen gas is evolved in this reaction, and assists the agitation. Stirring may be continued during the pyridine-sodamide reaction if desired. After about ten hours, the violent action of the released hydrogen is greatly lessened, and ammonia may be again fed, merely for agitation.

The product of the sodamide-pyridine reaction is a sodium compound of diamino pyridine, and it must be decomposed to produce the diamino pyridine, which is the object of the process. The decomposition is usually by means of water, resulting in the formation of sodium hydroxide or caustic soda. The presence of sodium hydroxide brings about a reduction in the yield of the amino pyridine by oxidation. To obviate or minimize this difficulty I use carbon dioxide together with a sufficient amount of water to convert the sodium into sodium carbonate. The carbon dioxide is fed in the gaseous state in the same manner as the ammonia is fed into the retort.

The advantages of this method of decomposition are, first, a great reduction in oxidation, and second, an anhydrous final product which facilitates crystallization of the amino pyridine which may be brought about by the use of benzol, toluol, xylol and the like.

Any one of the embodiments of the invention shown may be used in carrying out the process, the essential feature being a means to thoroughly crush and pulverize the sodamide as it cools and during the mixture with the oil in a dry atmosphere, and means to supply a gas under a selected pressure to the lower part of the retort.

In the embodiment of the invention shown in Figures 1 and 2, a retort is provided of suitable material, including a body 1 of cylindrical form, and a cover 2. The body has a marginal flange 3 at its top, upon which the cover rests, and to which it is secured by bolts and nuts 4 passing through the flange and cover.

The body 1 of the retort has an axial depressed portion forming a step bearing 5 for a purpose to be presently described, and the cover has an axial opening 6. A hollow shaft 7 is journaled in the step bearing and in the opening 6, a packing nut 8 being provided in the opening for making a fluid tight connection, and the lower end of the shaft is closed, and rests upon a ball 9 providing a ball bearing for the lower end of the shaft.

An elbow 10 is connected with the cover, and the elbow connects with a reflux condenser 11 of the usual construction by means of a pipe section 12, having a lateral branch 13. The cover is also provided with an eccentric opening in which is threaded a nipple 14, and a cap 15 is threaded onto the nipple.

Near its lower end the hollow shaft has oppositely extending lateral arms 16, each of which is provided with a line of perforations 17 in its underside, so that ammonia fed through the shaft 7 may pass out through the openings 17 into the retort. A check valve indicated at 18 is interposed in the length of the shaft, for preventing regurgitation through the shaft, and any suitable apparatus for supplying ammonia may be connected to the top thereof.

A pair of susbtantially right triangular plates 19 is secured to the arm 16 and to the shaft, the members of the pair being on opposite sides of the shaft, and the bases of the plates registering with the arms. A pair of cross bars 20 is connected with the shaft at the tops or apices of the plates 19, and the cross bars and plates serve as guides and holders for pulverizing plates indicated at 21. Each of these plates is substantially L shaped as shown, that is relatively wide at their bottoms and relatively narrow at their tops.

The plates at their lower ends rest upon the respective arms 16, and they are free to move toward and from the shaft between the cross bars and the plates 19, moving upon the arms 16. When the shaft is rotated centrifugal force tends to move the plates outward into close contact with the retort wall, so that they exercise a scraping force as well as a grinding or pulverizing function.

In operation, the metallic sodium is introduced into the retort and the retort is heated. At the proper time ammonia gas is admitted through the shaft 7 and the perforations 17, the gase bubbling up through the fused sodium. When all of the sodium metal has been converted, which moment may be ascertained by looking through the peep-hole 14 and observing the appearance of the mass, the mixture is permitted to cool to about 250° C., that is to a point very slightly below the igniting temperature of the oil to be used, and then the shaft 7 is started rotating and the necesssary amount of oil is at once introduced.

During the cooling, the action of the combined scraper and pulverizer is continued and when the mixture has reached the required temperature purified anhydrous pyridine is added, and the combined stirring and crushing is continued until the operation of forming alpha-alpha diamino pyridine is complete. At no time is the contents of the retort allowed to agglomerate or cake, and it is eventually delivered in a pulverulent condition.

In the embodiment of the invention shown in Fig. 3, the retort is similar to that shown in Fig. 1. The shaft 22 corresponding to the shaft 3 is provided near its lower end with four arms 23 forming a cross, and each of the arms has a line of perforations on its under side. The lower end of the shaft is received in a step bearing 25, and supported by balls 26.

A cross bar 27 extends transversely of the shaft just below the cross, and each arm carries a pair of spaced bearing lugs 28. A shaft 29 is journaled in each pair of lugs, and each shaft carries a plurality of similar rollers 30. The arrangement is such that the rollers 30 roll upon the bottom of the retort, and exert a crushing and stirring function on the contents of the retort. A second cross bar 31 is supported by the shaft above the cross bar 27 and parallel therewith, and the ends of the two bars are slotted to receive scraping and crushing plates 32. These plates are mounted like the plates 21, for free outward movement so that when the shaft is rotated, they are thrown outward into contact with the retort walls, scraping the same and crushing the material in the retort. The ammonia is fed through the shaft in the same manner as in the Fig. 1 construction.

In Fig. 4, is shown a ball mill, by means of which the operation may be performed. This mill includes a cylinder 33 having journal pins 34 and 35 which are journaled in pedestals 36. The journal pin 35 is hollow, and is connected with a condenser 37, a rotatable fluid tight connection indicated at 38 being provided for connecting the journal pin with the condenser.

A pipe 39 extends longitudinally of the casing 33, and the pipe and the casing wall have a row of registering perforations 40. One end of the pipe 39 is closed, and the other is adapted for connection with a pipe 41 for delivering ammonia to the pipe 39 and to the casing 33 from a suitable source of supply. A series of grinding balls 42 of usual construction is arranged in the casing.

In operation, the retort with sodium metal therein is heated to the required temperature, ammonia being supplied by the pipe 39. When the sodium has all been changed, the pipe 41 is disconnected, and the mill is rotated in any suitable manner. The balls thoroughly grind the material and prevent any caking or agglomeration thereof while cooling.

It will be apparent from the description that the improved process or method is a batch method, wherein none of the intermediate products are suffered to attain their normal condition of stability before conversion into the succeeding product. This is particularly true of the sodamide, which if allowed to do so would cake and agglomerate into a compact solid mass. By the energetic agitation, crushing and grinding, to which it is subjected as it cools from the high temperature of the reaction with ammonia to the lower temperature just below the igniting point of the selected oil medium, the sodamide is prevented from attaining this solid condition, and is converted into a powder, that is into the most feasible form for intimate mixture with the pyridine in the oil medium.

Inasmuch as the apparatus herein shown and described more properly constitutes subject matter for a divisional application, the same will not be claimed herein, the applicant reserving the right to claim such apparatus in appropriate divisional applications.

While I have herein specifically disclosed the preferred method of carrying out the present invention, it will be understood by workers skilled in the art that various changes may be made in the exact procedure outlined without departing from the underlying principle of the invention, as, for examples, by adding the selected oil medium in two batches; the first batch being added in the manner described in the specification, while the sodamide is being agitated for the purpose of converting it into granulated form and adding a second batch of the oil medium with the pyridine. The process may be modified further by adding all of the selected oil medium with the pyridine, either by mixing the pyridine and the oil medium prior to their introduction into the retort, or by introducing the oil and pyridine simultaneously into the retort.

What is claimed as new is:

1. In the method of making amino pyridines by reacting ammonia with fused sodium, treating the so formed sodamide with pyridine in an oil medium, and decomposing the product to obtain the amino pyridine, the step which consists in the direct conversion of the sodamide to a powder as it passes from the fused to the solid state.

2. In the method of making amino pyridines by reacting ammonia with fused sodium, treating the so formed sodamide with pyridine in an oil medium, and decomposing the sodium product, the step which consists in the conversion of the sodamide into the sodium product before the sodamide has attained its final consolidated state.

3. The batch method of preparing amino pyridines from the raw materials in a single retort, which consists in fusing sodium in the retort, reacting with ammonia, cooling to a selected temperature with agitation, adding the oil medium, permitting this mixture to react with pyridine, and decomposing the product to produce the amino pyridine.

4. The batch method of making amino pyridines in one vessel, which consists in reacting ammonia with fused sodium to produce sodamide, cooling to a selected temperature above the fusing point of the sodamide and below the igniting point of a selected oil medium for the pyridine, adding the oil to the fused sodamide, then adding pyridine and letting it react with the sodamide in an oil medium, and decomposing the product.

5. The patch method of making amino pyridines in one vessel, which consists in reacting ammonia with fused sodium to produce sodamide, cooling to a selected temperature above the fusing point of the sodamide and below the igniting point of a selected oil medium, adding the oil prior to the complete cooling of the sodamide, then adding pyridine to it and decomposing the product of the reaction in the presence of carbon dioxide.

6. In the method of making amino pyridines by reacting ammonia with fused sodium, treating the so formed sodamide with pyridine in an oil medium, and decomposing the sodium product, the step which consists in the conversion of each intermediate product into the succeeding before said intermediate product has attained its normal condition of stability.

7. In the method of making amino pyridines from the raw material, which consists in performing the several operations of making sodamide, reacting it with pyridine in an oil medium, and decomposing the formed sodium product, the step which consists in carrying out the operations in their proper sequence in a single vessel without suffering any of the intermediate products to cool to normal temperature.

8. The batch method of preparing amino pyridines from sodium metal, ammonia and pyridine, which consists in fusing the sodium while treating with ammonia gas to form sodamide, subjecting the formed sodamide to a crushing pulverizing action while cooling to a selected temperature whereby to directly convert the sodamide from the fused to the powdered state, mixing a selected oil with the powder, adding pyridine to the mixture, and afterwards decomposing the product.

9. The batch method of preparing amino pyridines from sodium metal, ammonia and pyridine, which consists in fusing the sodium while treating with ammonia gas to form sodamide, subjecting the formed sodamide to a crushing pulverizing action while cooling to a selected temperature whereby to directly convert the sodamide from the fused to the powdered state, mixing a selected oil with the powder, adding pyridine to the mixture, and afterwards decomposing the product in the presence of carbon dioxide.

10. In the method of preparing amino pyridines by reacting sodamide with pyridine in an oil medium and decomposing the product, the step which consists in using carbon dioxide gas with water for the decomposing agent.

11. The method of obtaining amino pyridines, which consists in reacting fused sodium with ammonia, cooling to about 250° C., adding oil and pure anhydrous pyridine while subjecting the mixture to a stirring action sufficient to prevent consolidation of the sodamide prior to the reaction with pyridine, and decomposing the product of the sodamide-pyridine reaction.

12. The method of obtaining amino pyridines, which consists in reacting fused sodium with ammonia, cooling to about 250° C., adding oil and pure anhydrous pyridine while subjecting the mixture to a stirring action sufficient to prevent consolidation of the sodamide prior to the reaction with pyridine, and decomposing the product of the sodamide-pyridine reaction in the presence of carbon dioxide.

13. The method of obtaining amino pyridines, which consists in making sodamide, cooling to just below the igniting point of a selected oil medium while preventing consolidation of the sodamide, adding the selected oil and forming an emulsion of the sodamide therewith, adding pure anhydrous pyridine, and decomposing the product.

14. In the method of making amino pyridines by reacting ammonia with fused sodium, treating the so formed sodamide with pyridine in an oil medium, and decomposing the product to obtain the amino pyridine, the step which consists in the direct conversion of the sodamide to a powder as it passes from the fused to the solid state in the same retort in which the sodamide was formed.

15. In the method of making amino pyridines by reacting ammonia with fused sodium, treating the so formed sodamide with pyridine in an oil medium, and decomposing the sodium product, the step which consists in the conversion of the sodamide into the sodium product before the sodamide has attained its final consolidated state in the same retort in which the sodamide was formed.

16. The method of obtaining alpha-alpha-diamino-pyridine, which consists in treating sodamide in a state of fusion with an indifferent medium in a cold state and with vigorous agitation, to partially cool the mixture, and to intimately mix the sodamide with the medium, adding anhydrous pyridine with agitation, and decomposing the product by means of water.

17. The method of obtaining alpha-alpha-diamino-pyridine which consists in treating sodamide in a state of fusion with cold oil at a temperature just below the igniting point of the oil with vigorous agitation to partially cool the mixture, and to intimately mix the sodamide with the oil, adding anhydrous pyridine with agitation, and decomposing the product into diamino-pyridine and a sodium salt.

18. The method of producing alpha-alpha-diamino-pyridine, which consists in adding an indifferent medium in a cold state to freshly prepared sodamide in a state of fusion and at a temperature of about 250° C., with vigorous agitation to produce a finely pulverized sodamide intimately mixed with the medium, cooling the mixture to a temperature of about 155° C., adding pure anhydrous pyridine with agitation, and afterwards decomposing the product by means of water.

Signed at New York city in the county of New York and State of New York this 3rd day of May A. D. 1927.

VICTOR V. UTGOFF.